United States Patent
Choi et al.

(10) Patent No.: US 9,799,926 B2
(45) Date of Patent: Oct. 24, 2017

(54) CURVED ELECTRODE STACK AND BATTERY CELL INCLUDING THE SAME

(71) Applicant: LG Chem, Ltd., Seoul (KR)

(72) Inventors: Eun Seok Choi, Daejeon (KR); Shin Hyo Cho, Daejeon (KR); Byung O Park, Daejeon (KR); Jae Bin Chung, Daejeon (KR); Dong-Myung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/892,301

(22) PCT Filed: May 8, 2014

(86) PCT No.: PCT/KR2014/004075
§ 371 (c)(1),
(2) Date: Nov. 19, 2015

(87) PCT Pub. No.: WO2015/016463
PCT Pub. Date: Feb. 5, 2015

(65) Prior Publication Data
US 2016/0268625 A1    Sep. 15, 2016

(30) Foreign Application Priority Data
Jul. 31, 2013  (KR) .......... 10-2013-0091211

(51) Int. Cl.
*H01M 10/058* (2010.01)
*H01M 10/04* (2006.01)
(Continued)

(52) U.S. Cl.
CPC ....... *H01M 10/058* (2013.01); *H01M 2/0202* (2013.01); *H01M 2/026* (2013.01);
(Continued)

(58) Field of Classification Search
CPC .. H01M 10/058; H01M 2/026; H01M 2/0287; H01M 10/0525; H01M 2/0202; H01M 10/0436
See application file for complete search history.

(56) References Cited

U.S. PATENT DOCUMENTS 6,599,659 B1    7/2003  Endo et al.
7,049,028 B2    5/2006  Notten et al.
(Continued)

FOREIGN PATENT DOCUMENTS

CN    1363123 A    8/2002
CN    1547782 A    11/2004
(Continued)

OTHER PUBLICATIONS

Extended Search Report from European Application No. 14832886.7, dated Oct. 21, 2016.
(Continued)

*Primary Examiner* — Stewart Fraser
(74) *Attorney, Agent, or Firm* — Lerner, David, Littenberg, Krumholz & Mentlik, LLP

(57) ABSTRACT

Disclosed herein are an electrode stack including at least one positive electrode, at least one negative electrode, and at least one separator, wherein the separator is laminated to one surface or opposite surfaces of at least one of the electrodes, the positive electrode, the negative electrode, and the separator are stacked such that the separator is disposed between the positive electrode and the negative electrode, and a stacked surface of each of the positive electrode, the negative electrode, and the separator includes a curved surface, and a battery cell including the same.

25 Claims, 4 Drawing Sheets

(51) Int. Cl.
- *H01M 10/0525* (2010.01)
- H01M 2/18 (2006.01)
- H01M 10/052 (2010.01)
- H01M 2/02 (2006.01)
- H01M 4/02 (2006.01)

(52) U.S. Cl.
CPC ..... *H01M 2/0287* (2013.01); *H01M 10/0436* (2013.01); *H01M 10/0525* (2013.01); H01M 2/18 (2013.01); H01M 10/052 (2013.01); H01M 2002/0205 (2013.01); H01M 2004/025 (2013.01); H01M 2220/30 (2013.01)

(56) References Cited

U.S. PATENT DOCUMENTS

| | | | |
|---|---|---|---|
| 2003/0013012 A1 | 1/2003 | Ahn et al. | |
| 2003/0039883 A1 | 2/2003 | Notten et al. | |
| 2003/0108787 A1* | 6/2003 | Endo | H01B 1/122 429/94 |
| 2005/0123824 A1* | 6/2005 | Ishikawa | H01M 10/0431 429/94 |
| 2007/0231701 A1* | 10/2007 | Lee | H01M 2/18 429/246 |
| 2011/0097615 A1* | 4/2011 | Goh | H01M 2/0275 429/94 |
| 2013/0224562 A1* | 8/2013 | Momo | H01M 10/0436 429/149 |
| 2014/0011076 A1* | 1/2014 | Kanemoto | H01M 2/022 429/163 |
| 2014/0050958 A1* | 2/2014 | Kwon | H01M 10/0583 429/94 |
| 2014/0079979 A1* | 3/2014 | Kwon | H01M 2/08 429/127 |
| 2014/0093762 A1 | 4/2014 | Goh et al. | |
| 2014/0205886 A1* | 7/2014 | Sakaguchi | H01M 2/1646 429/149 |
| 2016/0133987 A1* | 5/2016 | Choi | H01M 10/058 429/7 |

FOREIGN PATENT DOCUMENTS

| | | |
|---|---|---|
| CN | 101971388 A | 2/2011 |
| EP | 1244169 A1 | 9/2002 |
| EP | 2477267 A1 | 7/2012 |
| JP | H11273709 A | 10/1999 |
| JP | H11307130 A | 11/1999 |
| JP | 2001172595 A | 6/2001 |
| JP | 2001273930 A | 10/2001 |
| JP | 2002063938 A | 2/2002 |
| JP | 2004241250 A | 8/2004 |
| JP | 2005501385 A | 1/2005 |
| JP | 2010159333 A | 7/2010 |
| JP | 2011023333 A | 2/2011 |
| KR | 20010082058 A | 8/2001 |
| KR | 20070059981 A | 6/2007 |
| KR | 20080043926 A | 5/2008 |
| KR | 20090097731 A | 9/2009 |
| KR | 20090126904 A | 12/2009 |
| WO | 0182393 A2 | 11/2001 |
| WO | 2009113799 A2 | 9/2009 |

OTHER PUBLICATIONS

Search Report from Chinese Application No. 201480029314.2, dated Nov. 23, 2016.

International Search Report for Application No. PCT/KR2014/004075 dated Aug. 14, 2014.

* cited by examiner

[FIG. 1]
PRIOR ART
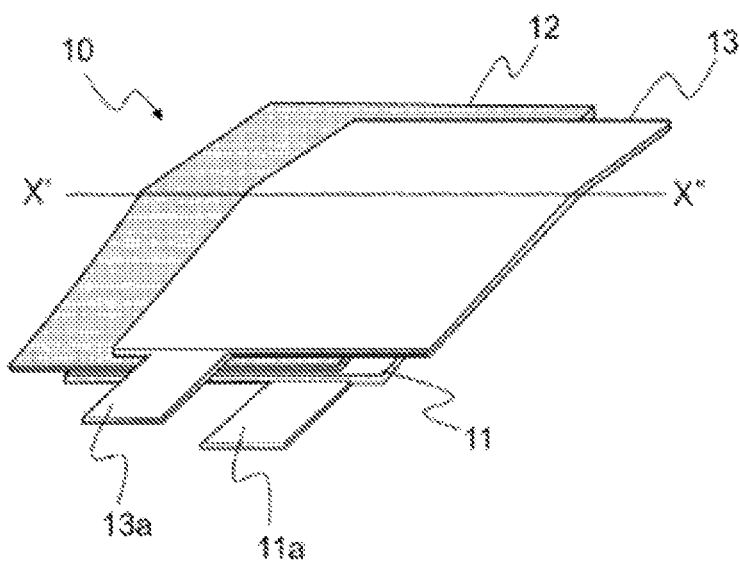
[FIG. 2]
PRIOR ART
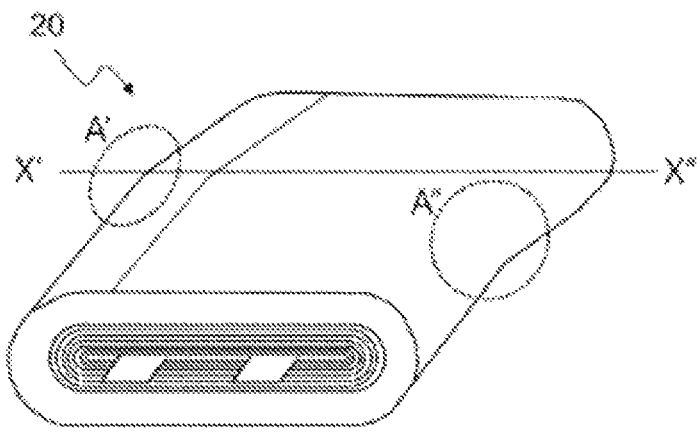

[FIG. 3]
PRIOR ART
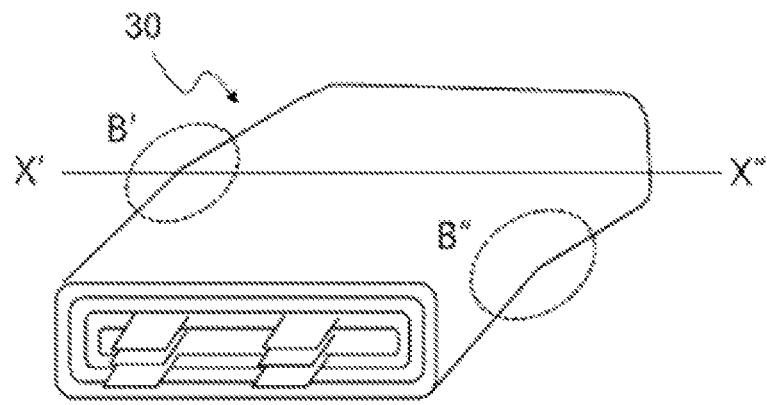
[FIG. 4]
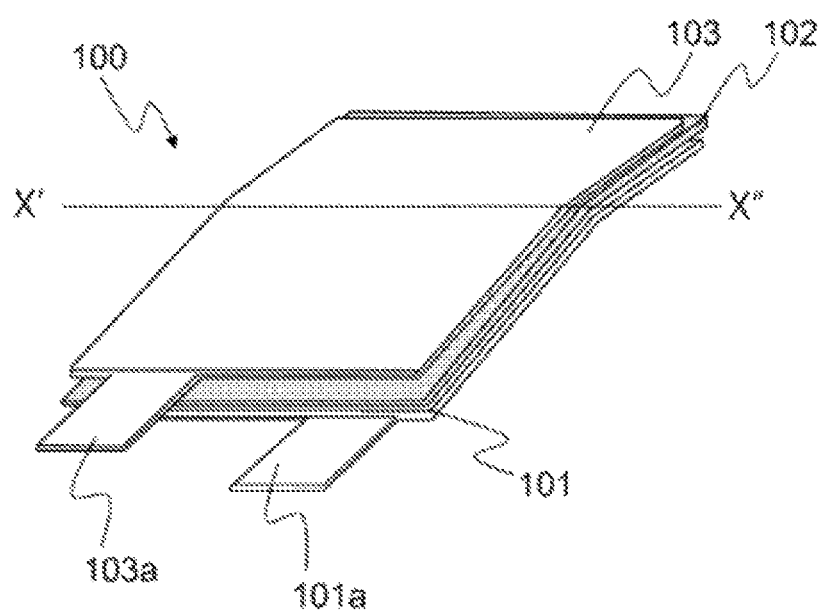

[FIG. 5]
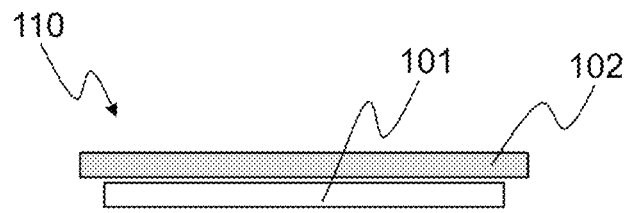
[FIG. 6]
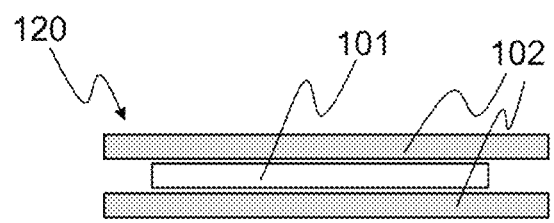
[FIG. 7]
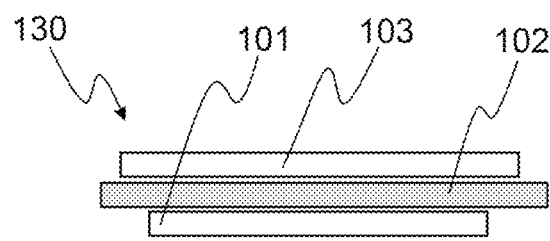
[FIG. 8]
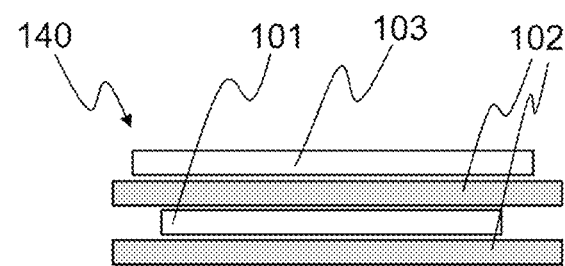

[FIG. 9]
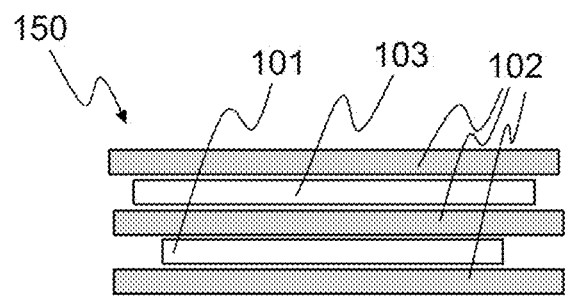
[FIG. 10]
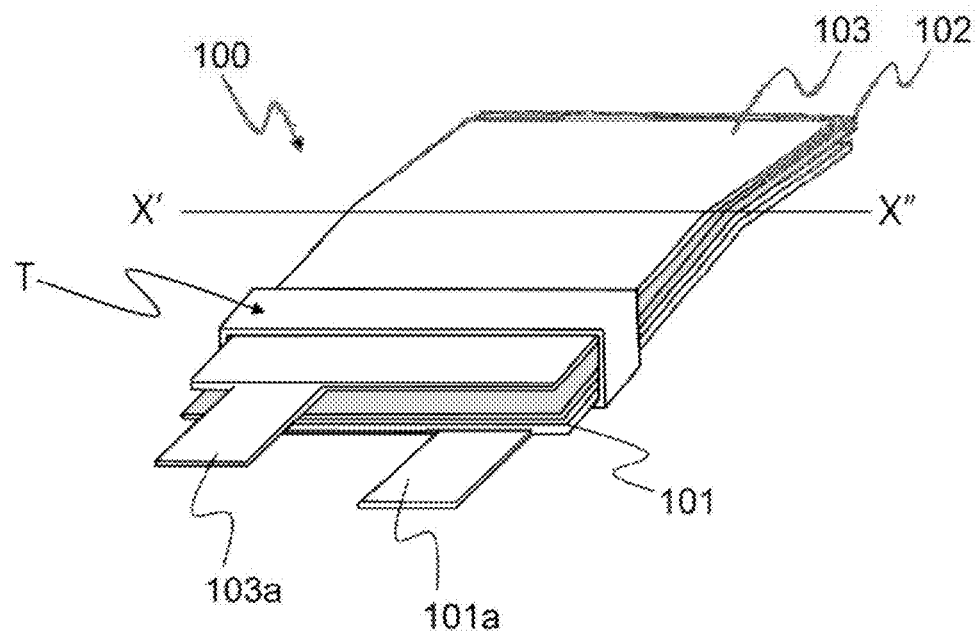

US 9,799,926 B2

CURVED ELECTRODE STACK AND BATTERY CELL INCLUDING THE SAME

CROSS REFERENCE TO RELATED APPLICATIONS

The present application is a national phase entry under 35 U.S.C. §371 of International Application No. PCT/KR2014/004075, filed May 8, 2014, which claims priority from Korean Patent Application No. 10-2013-0091211, filed Jul. 31, 2013, the disclosures of which are incorporated herein by reference.

TECHNICAL FIELD

The present invention relates to an electrode stack constituting a lithium secondary battery, and more particularly to a curved electrode stack.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

A lithium secondary battery is very important to realize such a ubiquitous society. The lithium secondary battery may be manufactured by receiving an electrode stack in a receiving part of a battery case together with an electrolyte and thermally bonding the outer edge of the receiving part.

As well-known examples of such an electrode stack, there are a stacked type electrode stack configured to have a structure in which positive electrode plates, separator plates, and negative electrode plates, each having a predetermined size, are repeatedly stacked such that the separator plates are disposed respectively between the positive electrode plates and the negative electrode plates, a wound (jelly-roll) type electrode stack configured to have a structure in which a positive electrode sheet, a separator sheet, and a negative electrode sheet, each having a predetermined size, are stacked such that the separator sheet is disposed between the positive electrode sheet and the negative electrode sheet, and then the separator sheet is wound in one direction, and a stacked and folded type electrode stack configured to have a structure in which a predetermined number of stacked type electrode stacks is arranged on a separator sheet, and then the separator sheet is wound in one direction such that the stacked type electrode stacks are stacked.

FIG. 1 is a typical view showing a curved stacked type electrode stack. For the convenience of description, a structure in which one positive electrode plate 11, one separator plate 12, and one negative electrode plate 13 are stacked is shown in FIG. 1. Alternatively, the electrode stack 10 may include a plurality of positive electrode plates, a plurality of separator plates, and a plurality of negative electrode plates. For the stacked type electrode stack 10 shown in FIG. 1, a large amount of man hours are incurred to stack the positive electrode plate 11, the separator plate 12, and the negative electrode plate 13.

FIG. 2 is a typical view showing a curved jelly-roll type electrode stack. Referring to FIG. 2, when the jelly-roll type electrode stack 20 is bent along an imaginary line X'-X" perpendicular to a direction in which electrode tabs protrude, stress is concentrated on opposite bent ends A' and A" of the jelly-roll type electrode stack 20 with the result that the electrodes of the jelly-roll type electrode stack 20 may be broken.

FIG. 3 is a typical view showing a curved stacked and folded type electrode stack. Referring to FIG. 3, when the stacked and folded type electrode stack 30 is bent along an imaginary line X'-X" perpendicular to a direction in which electrode tabs protrude, a separator sheet wrinkles at opposite bent ends B' and B" of the stacked and folded type electrode stack 30 with the result that the size and external appearance of the stacked and folded type electrode stack 30 may be deteriorated.

DISCLOSURE

Technical Problem

The present invention has been made to solve the above problems and other technical problems that have yet to be resolved, and it is an object of the present invention to provide a curved electrode stack exhibiting improved processability and yield and a battery cell including the same.

Technical Solution

In accordance with one aspect of the present invention, the above and other objects can be accomplished by the provision of an electrode stack including at least one positive electrode, at least one negative electrode, and at least one separator, wherein the separator is laminated to one surface or opposite surfaces of at least one of the electrodes, the positive electrode, the negative electrode, and the separator are stacked such that the separator is disposed between the positive electrode and the negative electrode, and a stacked surface of each of the positive electrode, the negative electrode, and the separator includes a curved surface. One end of each of the positive electrode, the negative electrode, and the separator of the electrode stack does not intersect the other end of each of the positive electrode, the negative electrode, and the separator of the electrode stack unlike a jelly-roll type electrode stack and a stacked and folded type electrode stack.

The electrode stack may include an improved electrode configured to have a structure in which a separator is laminated to one surface or opposite surfaces of at least one electrode. For example, the improved electrode may be configured to have a structure in which a separator is laminated to one surface of a positive electrode or a negative electrode. In addition, the improved electrode may be configured to have a structure in which separators are laminated to opposite surfaces of a positive electrode or opposite surfaces of a negative electrode. In addition, the improved electrode may be configured to have a structure in which a positive electrode, a separator, and a negative electrode are laminated in a state in which the separator is disposed between the positive electrode and the negative electrode. In this specification, an embodiment example configured to have a structure in which a positive electrode, a separator, and a negative electrode are laminated in a state in which the separator is disposed between the positive electrode and the negative electrode may be defined as an electrode group.

The outermost electrodes of the electrode group may have the same polarity or different polarities. In a case in which the outermost electrodes of the electrode group have the same polarity, the electrode group may be referred to as an S type electrode group. On the other hand, in a case in which the outermost electrodes of the electrode group have different polarities, the electrode group may be referred to as a D type electrode group. At least one of the outermost electrodes may be laminated to separators in a state in which the at least one of the outermost electrodes is disposed between the separators.

In addition, the improved electrode may be configured to have a structure in which one selected from between a positive electrode and a negative electrode and a separator are included, and one selected from between the positive electrode and the negative electrode is laminated to the separator, which may be referred to as an electrode element. The electrode element may be configured to have a structure in which one selected from between a positive electrode and a negative electrode is laminated to the separators in a state in which one selected from between the positive electrode and the negative electrode is disposed between the separators.

The electrode, the improved electrode, the separator, the electrode group, and the electrode element may be combined to constitute an electrode stack having a structure in which a separator is disposed between a positive electrode and a negative electrode, which is included in the scope of the present invention.

The stacked surface of each of the positive electrode, the negative electrode, and the separator of the electrode stack may include a curved surface. Specifically, the curved surface may have a radius of curvature of 35 mm to less than 900 mm.

The electrode stack may include at least one non-curved surface. The non-curved surface may be provided at the stacked surface or at a side surface of the electrode stack that is not parallel to the stacked surface. The side surface may be perpendicular to the stacked surface. Electrode tabs may be formed at the non-curved surface. Both a positive electrode tab and a negative electrode tab may be formed at one non-curved surface. On the other hand, a positive electrode tab may be formed at one non-curved surface, and a negative electrode tab may be formed at another non-curved surface. The electrode tabs may be connected to electrode leads to constitute electrode terminals, which may be connected to a protection circuit module (PCM).

In a non-limiting example of the present invention, the non-curved surface may be formed at each side surface of the electrode stack that is not parallel to the stacked surface. Each side surface may include one or more non-curved surfaces. Both the positive electrode tab and the negative electrode tab may be formed at one of the side surfaces.

In a non-limiting example of the present invention, the electrode stack may be configured such that lamination surfaces are formed between the electrode and the separator constituting the electrode group or the electrode element, and the lamination surfaces are laminated to each other using a pressure-sensitive adhesive.

The positive electrode or the negative electrode and the separator constituting the electrode group or the electrode element are laminated to each other. When the curved surface is formed at the electrode stack, therefore, a gap between the components of the electrode group or the electrode element due to the difference in the radius of curvature between the components of the electrode group or the electrode element may not be great. In a case in which the curved surface is formed at the electrode stack in a state in which an electrode group and another electrode group, an electrode group and an electrode element, or an electrode element and another electrode element are simply stacked, however, a gap may be generated between an electrode group and another electrode group, between an electrode group and an electrode element, or between an electrode element and another electrode element due to the difference in the radius of curvature between the components.

In order to reduce this gap, adhesion surfaces may be formed between the electrode group and the electrode group, between the electrode group and the electrode element, or between the electrode element and the electrode element, and the adhesion surfaces may be adhered to each other using the pressure-sensitive adhesive.

The pressure-sensitive adhesive is not particularly restricted so long as the pressure-sensitive adhesive can provide adhesion force based on pressure. For example, the pressure-sensitive adhesive may be a combination of one or more selected from a group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, and fluoro rubber.

The same amount or different amounts of the pressure-sensitive adhesives may be applied to the lamination surfaces and the adhesion surfaces. Specifically, the same amount of the pressure-sensitive adhesives may be applied to the lamination surfaces and the adhesion surfaces.

In addition, the lamination surfaces may have coupling force equal to or different from that of the adhesion surfaces. Specifically, the coupling force of the lamination surfaces may be higher than that of the adhesion surfaces.

The adhesion force of the pressure-sensitive adhesive may increase in proportion to the amount of the pressure-sensitive adhesive that is applied and to the pressure that is applied to the pressure-sensitive adhesive. During manufacturing of the electrode group or the electrode element, pressure is first applied to the lamination surfaces, and then pressure is applied to the lamination surfaces during manufacturing of the electrode stack. In a case in which the same amount of the pressure-sensitive adhesives are applied to the lamination surfaces and the adhesion surfaces, therefore, the coupling force of the lamination surfaces may be higher than that of the adhesion surfaces.

In one example, therefore, a large amount of pressure-sensitive adhesive may be applied to the adhesion surfaces such that the coupling force of the lamination surfaces is equal to that of the adhesion surfaces.

In this case, however, a process of applying the pressure-sensitive adhesive to the lamination surfaces and a process of applying the pressure-sensitive adhesive to the adhesion surfaces are needed with the result that a production process is complicated, and a larger number of production facilities and a larger amount of production cost are required. For this reason, it is preferable to apply the same amount of the pressure-sensitive adhesives to the lamination surfaces and the adhesion surfaces in terms of efficiency of the production process and reduction of the production cost.

In a non-limiting example of the present invention, the electrode stack may further include a fixing member for securely maintaining a stacked structure of the electrode group, the electrode element, the positive electrode, the negative electrode, and/or the separator.

The fixing member, which is an external member of the electrode stack, may be a cohesive tape of an adhesive tape for wrapping some or all of the outer surface of the electrode stack.

The outer surface of the electrode stack may include side surfaces, a top surface, a front surface, and a rear surface of the electrode stack.

The fixing member may be a portion of the separator constituting the electrode group or the electrode element. In this case, the end of the separator may be thermally bonded to fix the electrode stack. However, the present invention is not limited thereto.

The fixing member may include all members that are capable of functioning to fix the electrode stack.

In a case in which the stacked type electrode assembly is manufactured while including the fixing member, it is possible to improve yield and mass productivity as compared with a stacked type electrode assembly configured to have a structure in which the positive electrode, the negative electrode, the separator, the electrode group, and the electrode element are simply stacked.

In addition, the positive electrode, the separator, and the negative electrode are laminated to each other on a per electrode group or electrode element basis. Consequently, it is possible to minimize the increase in size of the electrode stack due to swelling.

In accordance with another aspect of the present invention, there is provided a battery cell including the electrode stack with the above-stated construction mounted in a battery case together with an electrolyte. The battery case may be a metal can or a pouch-shaped battery case made of a laminate sheet including a metal layer and a resin layer. The battery case may have a shape corresponding to the curved shape of the electrode stack. The battery cell may be a lithium ion polymer battery, a lithium ion battery, or a lithium polymer battery. Known structures and components of the lithium ion polymer battery, the lithium ion battery, and the lithium polymer battery are herein incorporated by reference. In accordance with a further aspect of the present invention, there is provided a battery pack including the battery cell and a protection circuit module (PCM). The protection circuit module may be connected to electrode terminals of the battery cell.

The battery pack may be used as a power source for a curved smart phone, a curved mobile phone, a curved laptop computer, a curved tablet PC, a curved clock, a curved television, or curved glasses.

DESCRIPTION OF DRAWINGS

The above and other objects, features and other advantages of the present invention will be more clearly understood from the following detailed description taken in conjunction with the accompanying drawings, in which:

FIG. 1 is a view typically showing a curved stacked type electrode stack;

FIG. 2 is a view typically showing a curved jelly-roll type electrode stack;

FIG. 3 is a view typically showing a curved stacked and folded type electrode stack;

FIG. 4 is a view typically showing a curved electrode stack according to a non-limiting example of the present invention;

FIGS. 5 to 9 are views typically showing various embodiment examples of an improved electrode constituting the electrode stack of FIG. 4; and FIG. 10 is a view typically showing an electrode stack further including a fixing member according to another non-limiting example of the present invention.

BEST MODE

Now, exemplary embodiments of the present invention will be described in detail with reference to the accompanying drawings. It should be noted, however, that the scope of the present invention is not limited by the illustrated embodiments.

FIG. 4 is a view showing a curved electrode stack 100 according to a non-limiting example of the present invention. For the convenience of description, a structure in which one positive electrode 101, one separator 102, and one negative electrode 103 are stacked is shown in FIG. 4. On the other hand, the electrode stack 100 may include a plurality of positive electrodes, a plurality of separators, and a plurality of negative electrodes.

The electrode stack 100 includes a positive electrode 101, a separator 102, and a negative electrode 103. The positive electrode 101 is provided with a positive electrode tab 101a having no positive electrode material applied thereto, and the negative electrode 103 is provided with a negative electrode tab 103a having no negative electrode material applied thereto. In the electrode stack 100, a curved surface is formed at a stacked surface of each of the positive electrode 101, the separator 102, and the negative electrode 103, and non-curved surfaces are formed at two side surfaces which are not parallel to the stacked surface. The positive electrode tab 101a and the negative electrode tab 103a are formed at one of the two side surfaces. The positive electrode tab 101a and the negative electrode tab 103a are coupled to a positive electrode lead (not shown) and a negative electrode lead (not shown) to form a positive electrode terminal and a negative electrode terminal, respectively.

In the electrode stack 100, one end of each of the positive electrode 101, the separator 102, and the negative electrode 103 does not intersect the other end of each of the positive electrode 101, the separator 102, and the negative electrode 103 unlike the jelly-roll type electrode stack 20 of FIG. 2 and the stacked and folded type electrode stack 30 of FIG. 3. That is, no separator sheet is interposed between the positive electrode 101 and the negative electrode 103. Even in a case in which the electrode stack 100 is bent along an imaginary line X'-X" perpendicular to a direction in which the positive electrode tab 101a and the negative electrode tab 103a are formed, therefore, the electrodes are not broken at the opposite bent ends of the electrode stack 100, or the separator sheet does not wrinkle.

In addition, in the electrode stack 100 according to the non-limiting example of the present invention, one surface or opposite surfaces of at least one of the electrodes 101 and 103 are laminated to the separator 102 unlike the stacked type electrode stack 10 of FIG. 1. Even in a case in which the electrode stack 100 is bent along the imaginary line X'-X", therefore, it is possible to minimize a possibility that the positive electrode 101, the separator 102, and the negative electrode 103 will be out of place.

An improved electrode configured to have a structure in which a separator is laminated to one surface or opposite surfaces of at least one electrode may have various structures as shown in FIGS. 5 to 9. However, the present invention is not limited to the structures shown in FIGS. 5 to 9.

FIG. 5 is a view typically showing a first embodiment example 110 configured to have a structure in which a separator 102 is laminated to one surface of a positive electrode 101. FIG. 6 is a view typically showing a second embodiment example 120 configured to have a structure in which separators 102 are laminated to opposite surfaces of a positive electrode 101. FIG. 7 is a view typically showing a third embodiment example 130 configured to have a structure in which a positive electrode 101, a separator 102, and a negative electrode 103 are laminated in a state in which the separator 102 is disposed between the positive electrode 101 and the negative electrode 103. FIG. 8 is a view typically showing a fourth embodiment example 140 configured to have a structure in which the positive electrode 101, which is one of the outermost electrodes 101 and 103 of the third embodiment example 130 of FIG. 7, is laminated to separators 102 in a state in which the positive electrode 101 is disposed between the separators 102. FIG. 9 is a view typically showing a fifth embodiment example 150 configured to have a structure in which the outermost electrodes 101 and 103 of the third embodiment example 130 of FIG. 7 are laminated to separators 102 in a state in which the electrodes 101 and 103 are disposed between the separators 102. The second embodiment example 120 may be referred to as an electrode element, and the third embodiment example 130 may be referred to as an electrode group.

FIG. 10 is a view typically showing an embodiment in which a fixing member T is further added to the curved electrode stack 100. For the convenience of description, a structure in which one positive electrode 101, one separator 102, and one negative electrode 103 are stacked is shown in FIG. 10. On the other hand, the electrode stack 100 may include a plurality of positive electrodes, a plurality of separators, a plurality of negative electrodes, a plurality of electrode groups, and a plurality of electrode elements.

In order to ensure stacking stability of a simple stacked structure, one side of the stacked structure may be fixed using an additional member. As shown in FIG. 10, the fixing member T may be a tape for wrapping the overall surface of the electrode stack 100.

The electrode stack 100 may include a combination of a plurality of positive electrodes 101, a plurality of separators 102, a plurality of negative electrodes 103, and one or more selected from a group consisting of a first embodiment example 110, a second embodiment example 120, a third embodiment example 130, a fourth embodiment example 140, and a fifth embodiment example 150.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a curved electrode stack according to the present invention is configured using an improved electrode without a separator sheet. Consequently, it is possible to solve problems, such as wrinkles caused when using the separator sheet, breakage of electrodes at a bent portion of the electrode stack, and a short circuit between a positive electrode and a negative electrode caused during a bending process, thereby simultaneously improving yield and processability.

The invention claimed is:

1. An electrode stack comprising at least one positive electrode, at least one negative electrode, and at least one separator, wherein a first separator of the at least one separator is laminated to one surface or opposite surfaces of at least one of the electrodes, a first positive electrode of the at least one positive electrode, a first negative electrode of the at least one negative electrode, and the first separator are stacked such that the first separator is disposed between the first positive electrode and the first negative electrode, and a stacked surface of each of the first positive electrode, the first negative electrode, and the first separator comprises a curved surface.

2. The electrode stack according to claim 1, wherein the electrode stack comprises at least one non-curved surface.

3. The electrode stack according to claim 1, wherein a side surface of the electrode stack that is not parallel to the stacked surface comprises one or more non-curved surfaces.

4. The electrode stack according to claim 1, wherein electrode terminals are formed at one or more non-curved surfaces.

5. The electrode stack according to claim 4, wherein both a positive electrode terminal and a negative electrode terminal are formed at one of the non-curved surfaces.

6. The electrode stack according to claim 4, wherein a positive electrode terminal is formed at one of the non-curved surfaces, and a negative electrode terminal is formed at the other of the non-curved surfaces.

7. The electrode stack according to claim 1, wherein the electrode stack comprises an electrode group comprising at least one positive electrode, at least one negative electrode, and at least one separator, the electrode group being configured to have a structure in which the positive electrode, the separator, and the negative electrode are laminated in a state in which the separator is disposed between the positive electrode and the negative electrode.

8. The electrode stack according to claim 7, wherein the electrode group is configured to have a structure in which outermost ones of the electrodes have the same polarity or different polarities.

9. The electrode stack according to claim 8, wherein at least one of the outermost electrodes is laminated to the separators in a state in which the at least one of the outermost electrodes is disposed between the separators.

10. The electrode stack according to claim 1, wherein the electrode stack comprises an electrode element comprising one selected from between a positive electrode and a negative electrode and at least one separator, the electrode element being configured to have a structure in which one selected from between the positive electrode and the negative electrode is laminated to the separator.

11. The electrode stack according to claim 10, wherein the electrode element is configured to have a structure in which one selected from between the positive electrode and the negative electrode is laminated to the separators in a state in which one selected from between the positive electrode and the negative electrode is disposed between the separators.

12. The electrode stack according to claim 1, wherein one end of each of the first positive electrode, the first negative electrode, and the first separator does not intersect the other end of each of the first positive electrode, the first negative electrode, and the first separator.

13. The electrode stack according to claim 1, wherein lamination surfaces are formed between the electrode and the first separator constituting the electrode group or the electrode element, and the lamination surfaces are laminated to each other using a pressure-sensitive adhesive.

14. The electrode stack according to claim 13, wherein adhesion surfaces are formed between the electrode group and the electrode group, between the electrode group and the electrode element, or between the electrode element and the electrode element, and the adhesion surfaces are adhered to each other using the pressure-sensitive adhesive.

15. The electrode stack according to claim 14, wherein the same amount or different amounts of the pressure-sensitive adhesives are applied to the lamination surfaces and the adhesion surfaces.

16. The electrode stack according to claim 15, wherein the same amount of the pressure-sensitive adhesives are applied to the lamination surfaces and the adhesion surfaces.

17. The electrode stack according to claim 14, wherein the lamination surfaces have coupling force equal to or different from that of the adhesion surfaces.

18. The electrode stack according to claim 1, further comprising a fixing member.

19. A battery cell comprising an electrode stack according to claim 1 mounted in a battery case together with an electrolyte.

20. The battery cell according to claim 19, wherein the battery case is a metal can or a pouch-shaped battery case made of a laminate sheet comprising a metal layer and a resin layer.

21. The battery cell according to claim 20, wherein the battery cell is a lithium ion polymer battery, a lithium ion battery, or a lithium polymer battery.

22. A battery pack comprising a battery cell according to claim 19 and a protection circuit module (PCM), wherein the protection circuit module is connected to electrode terminals of the battery cell.

23. A device comprising a battery pack according to claim 22.

24. The device according to claim 23, wherein the device is a smart phone, a mobile phone, a laptop computer, a tablet PC, a clock, a television, or glasses.

25. An electrode stack comprising:
  an electrode group comprising at least one positive electrode, at least one negative electrode, and at least one first separator, the electrode group being configured to have a structure in which the at least one positive electrode, the at least one separator, and the at least one negative electrode are laminated in a state in which the at least one separator is disposed between the at least one positive electrode and the at least one negative electrode;
  an electrode element comprising an extra electrode selected from one of a positive electrode and a negative electrode and a second separator, the electrode element being configured to have a structure in which the extra electrode is laminated to the second separator;
  wherein the electrode element is configured to have a structure in which the extra electrode is disposed between the first and second separators, a stacked surface of each of the at least one positive electrode, the at least one negative electrode, and the at least one first separator comprises a curved surface, wherein lamination surfaces are formed between the electrode and the separator constituting the electrode group or the electrode element, and the lamination surfaces are laminated to each other using a pressure-sensitive adhesive, wherein adhesion surfaces are formed between the electrode group and the electrode group, between the electrode group and the electrode element, or between the electrode element and the electrode element, and the adhesion surfaces are adhered to each other using the pressure-sensitive adhesive.

* * * * *